(12) United States Patent
Grinberg

(10) Patent No.: US 8,443,110 B2
(45) Date of Patent: May 14, 2013

(54) APPROACH FOR DISCOVERING DEVICES ON A COMMON BUS WITHOUT DIRECT COMMUNICATION

(75) Inventor: Paul Grinberg, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 43 days.

(21) Appl. No.: 13/037,301

(22) Filed: Feb. 28, 2011

(65) Prior Publication Data

US 2012/0221746 A1    Aug. 30, 2012

(51) Int. Cl.
*G06F 3/00*    (2006.01)
*H04L 12/28*    (2006.01)

(52) U.S. Cl.
USPC ............................................... 710/3; 370/256

(58) Field of Classification Search ....... 710/3; 370/256
See application file for complete search history.

(56) References Cited

U.S. PATENT DOCUMENTS

| | | | |
|---|---|---|---|
| 4,086,628 A * | 4/1978 | Woodrum | 1/1 |
| 4,860,006 A | 8/1989 | Barall | |
| 6,487,601 B1 | 11/2002 | Hubacher et al. | |
| 6,611,863 B1 | 8/2003 | Banginwar | |
| 7,096,257 B2 | 8/2006 | Trisno et al. | |
| 7,370,093 B2 | 5/2008 | Ohara | |
| 7,835,372 B2 | 11/2010 | Wang et al. | |
| 7,986,701 B2 | 7/2011 | Kore et al. | |
| 7,987,247 B2 | 7/2011 | Westphal et al. | |
| 2001/0043569 A1 * | 11/2001 | Wood, Jr. | 370/256 |
| 2009/0271001 A1 * | 10/2009 | Westphal et al. | 700/3 |
| 2011/0035633 A1 * | 2/2011 | Jones et al. | 714/57 |
| 2011/0267169 A1 * | 11/2011 | Kastli et al. | 340/3.44 |

FOREIGN PATENT DOCUMENTS

EP    2023544    2/2009

OTHER PUBLICATIONS

BACnet—MS/TP Working Group, Meeting Minutes, 2 pages, Apr. 22, 2008.
BACnet—MS/TP Working Group, Meeting Minutes, 2 pages, Jan. 26, 2007.
Business Wire, "New Multi-Channel Software from Kiyon Delivers Broadband and Quality Multi-Services (QOS) for Wireless," 5 pages, Jun. 13, 2006.

* cited by examiner

*Primary Examiner* — Hyun Nam
(74) *Attorney, Agent, or Firm* — Seager Tufte & Wickhem LLC.

(57) ABSTRACT

A system for discovering devices on a common bus without direct communication. Each device on the bus has a unique identification. One of the devices or a computer may be a master or a host. The host may broadcast a request asking every device with an identification value in a particular range to respond. If no device or one device exists on the bus in this particular range, then there is no or one response, respectively. If multiple devices exist within the range, then multiple responses may be received by the host. In a case of multiple responses, the host may re-transmit its request to one or more half ranges. If multiple responses are again received, then the host may again re-transmit its request where the half range or ranges are again split in half. This approach of half-range reduction may be repeated until no more collisions occur.

20 Claims, 3 Drawing Sheets

APPROACH FOR DISCOVERING DEVICES ON A COMMON BUS WITHOUT DIRECT COMMUNICATION

BACKGROUND

The present disclosure pertains to shared communication buses and particularly to devices on the shared buses. The disclosure more particularly pertains to determining the devices on a bus.

SUMMARY

The disclosure reveals a system for discovering devices on a common bus without direct communication to those devices or any a priori knowledge about those devices or the bus. It may be known that each device on the bus has a unique identification of some kind.

DESCRIPTION

Figure 1:
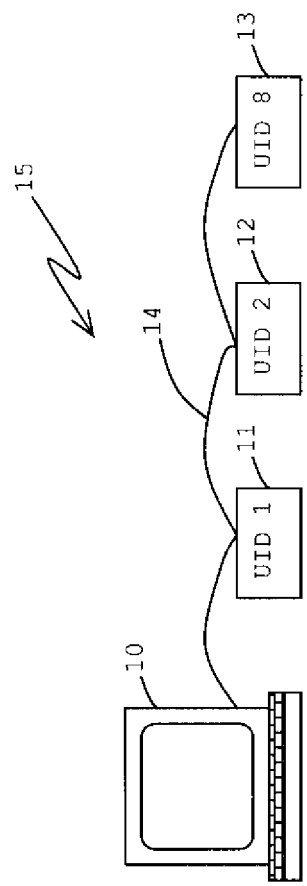
FIG. 1 is a diagram of a communication system having a bus, devices and a host.

The disclosure reveals a system for discovering devices on a common bus without direct communication to those devices or any a priori knowledge about those devices or the bus. It may be known that each device on the bus has a unique identification of some kind, such as a serial number. One of the devices may be a master or a host. Or there may be a personal computer connected to the bus that acts as a host. The host may know the full range of possible unique identification values of all of the devices, but not necessarily the individual values. The host may broadcast a message asking every device with an identification value in a range of, for instance, 10 to 50, to answer. If no devices exist on the bus in this particular range, then there is no answer. If only one device answers, then there will be exactly one answer. If one device provides multiple responses to the same broadcast message, than the responses may be considered as one answer. If multiple devices exist within the designated range, then multiple answers from different devices may arrive either simultaneously overlapping even by one bit resulting in a collision detectable by the host or consecutively within the allotted time and also be detected by the host as multiple valid responses which may be treated as a collision. In an event of an occurrence of a collision, the host may re-transmit its request but where the range is half of the previous range. If multiple answers are again received, then the host may again re-transmit its request where the range is again one-half of the reduced previous range. This approach of range reduction may be repeated until no more collisions occur or no answers are received. This approach may similarly be applied to the other halves of the range. When a device on the bus is uniquely identified, it may be assigned a valid MAC address. A valid MAC address may be a media access control address which is a unique identifier assigned to network interfaces for direct communications on a physical network segment. MAC addresses may be used with numerous network technologies. There may be a mapping of the unique identification values and the MAC addresses through techniques such as device discovery described herein. A MAC address assignment may facilitate direct communication via a MAC address to a device rather than a broadcast communication. Device discovery may be a result of a binary search mechanism being applied. The present approach may permit a reasonably accurate estimate of time for discovery of devices on a bus.

BACnet (building automation and control network) MS/TP (master slave/token-passing) communication may be done over a 2-wire bus shared by virtually all devices connected to the bus. Since every device may see all communications, there is an inherent need to address specific messages to desired recipients. This may require a priori knowledge of some unique identification (unique ID) of that recipient. For example, in MS/TP, this is a MAC (media access control) address. However, this information is not necessarily available when it is unknown as to which devices are available on the bus.

The present approach may take an advantage of a fact that virtually all devices may listen to all communications and respond to broadcast messages. If the central host knows the full range of possible unique ID values of every device, the host may broadcast a message asking every device with a unique ID in the range of A to B to answer. If no such devices exist on the bus, there may be no answer. If only one such device exists, there may be exactly one answer. If multiple devices exist, then multiple answers may arrive either simultaneously overlapping even by one bit resulting in a collision detectable by the host or consecutively within the allotted time and also be detected by the host as multiple valid responses which may be treated as a collision. If a collision occurs, the host may re-broadcast its request but with a follow-up message where the range is defined as one half of the original range. This process may be repeated until there are no more collisions detected or no answers are received. No collision may imply only one response or answer, or no response or answer. The present approach may be regarded as a binary search mechanism applied to device discovery.

One application of this mechanism may be for a discovery phase of automatic assignment of MS/TP MAC addresses in BACnet networks. After an initial installation of virtually all devices, a host device like a global controller may be used to identify the devices on the bus and then present this information to a user to (or automatically) assign MAC addresses to those devices.

FIG. 1 is a diagram of an illustrative example of a communication system 15 having a bus 14. Devices 11, 12 and 13 may be connected to bus 14. There may be more or fewer devices connected to bus 14. One of the devices may be a host, or another kind of device, such as for example a PC, may be a host 10. All of the devices may be known to have unique IDs. Host 10 may broadcast a message on a bus 14 asking every device having a unique ID in a range 21 of 0 to 15 being required to answer.

Figure 2:
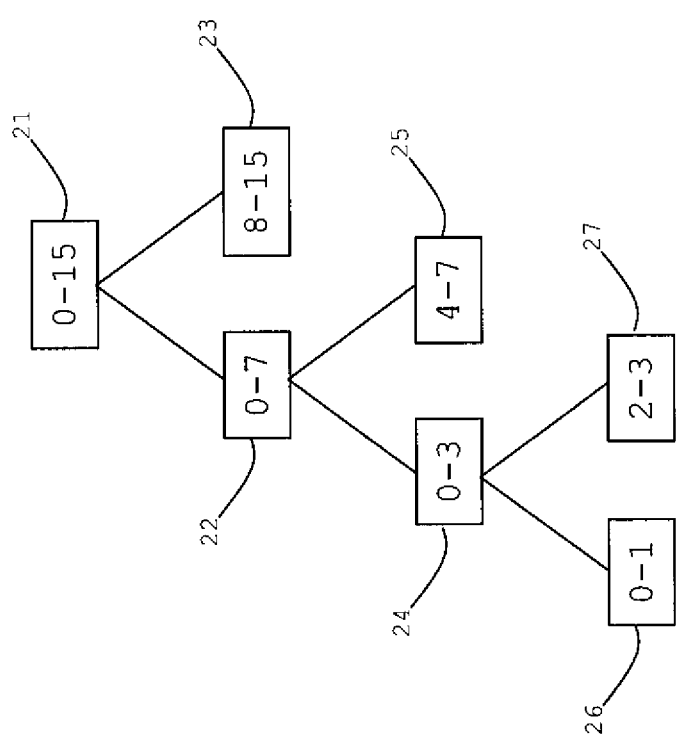
FIG. 2 is a diagram of example ranges used to discover a presence of certain devices.

FIG. 2 is a diagram of ranges used to discover a presence of devices in an example shown in FIG. 1. Messages from all three devices 11, 12 and 13 may result in a collision, since the unique ID values are 1, 2 and 8, respectively. Thus, range 21 may be divided into ranges 22 and 23. Range 22 may have a value from 0 to 7 and range 23 may have a value from 8 to 15. A broadcast message may be sent on bus 14 asking every device having a unique ID in range 22 to respond. Devices 11 and 12 may answer resulting in a collision. Range 22 may further divided into ranges 24 and 25 having values from 0 to 3 and 4 to 7, respectively.

A broadcast message may be sent on bus 14 asking every device having a unique ID in range 24 to respond. Devices 11 and 12 may answer resulting in a collision. Range 24 may further be divided into ranges 26 and 27 having values from 0-1 and 2-3. A broadcast message may be sent on bus 14 asking every device having a unique ID in range 26 to respond. Just device 11 may respond resulting in exactly one answer. If one device provides multiple responses to the same broadcast message, then the responses may be considered as one answer. Range 26 does not necessarily need to be divided. A broadcast message may be sent on bus 14 asking every device having a unique ID in range 27 to respond. Just device 12 may respond resulting in exactly one answer on bus 14. Incidentally, a device might respond with another answer to the same broadcast message. Since the responding device is the same, the other answer and the first answer may together be considered as one answer. There might be even additional such answers from the same device in response to the same message from the host to be considered together as the one answer. Range 27 does not necessarily need to be divided. A broadcast message may be sent on bus 14 asking every device having a unique ID in range 25 to respond. No device will appear to respond. Range 25 does not necessarily need to be divided. A broadcast message may be sent on bus 14 asking every device having a unique ID in range 23 to respond. Just device 13 may respond resulting in an answer. Range 23 does not necessarily need to be divided. At this point of the approach, all devices on Bus 14 with a unique ID in range 21 appear to have been identified. Time may be saved because not necessarily all ranges need to be split to determine the presence of all of the devices on bus 14. The present binary search mechanism may eliminate unnecessary checks of many incremental or larger portions of the range and thereby result in a much quicker and more efficient check for devices than if all of the incremental portions of the range were checked for devices, particularly when there is not always a device in every portion of the range. An incremental portion would contain at most only one device with a unique ID.

Figure 3:
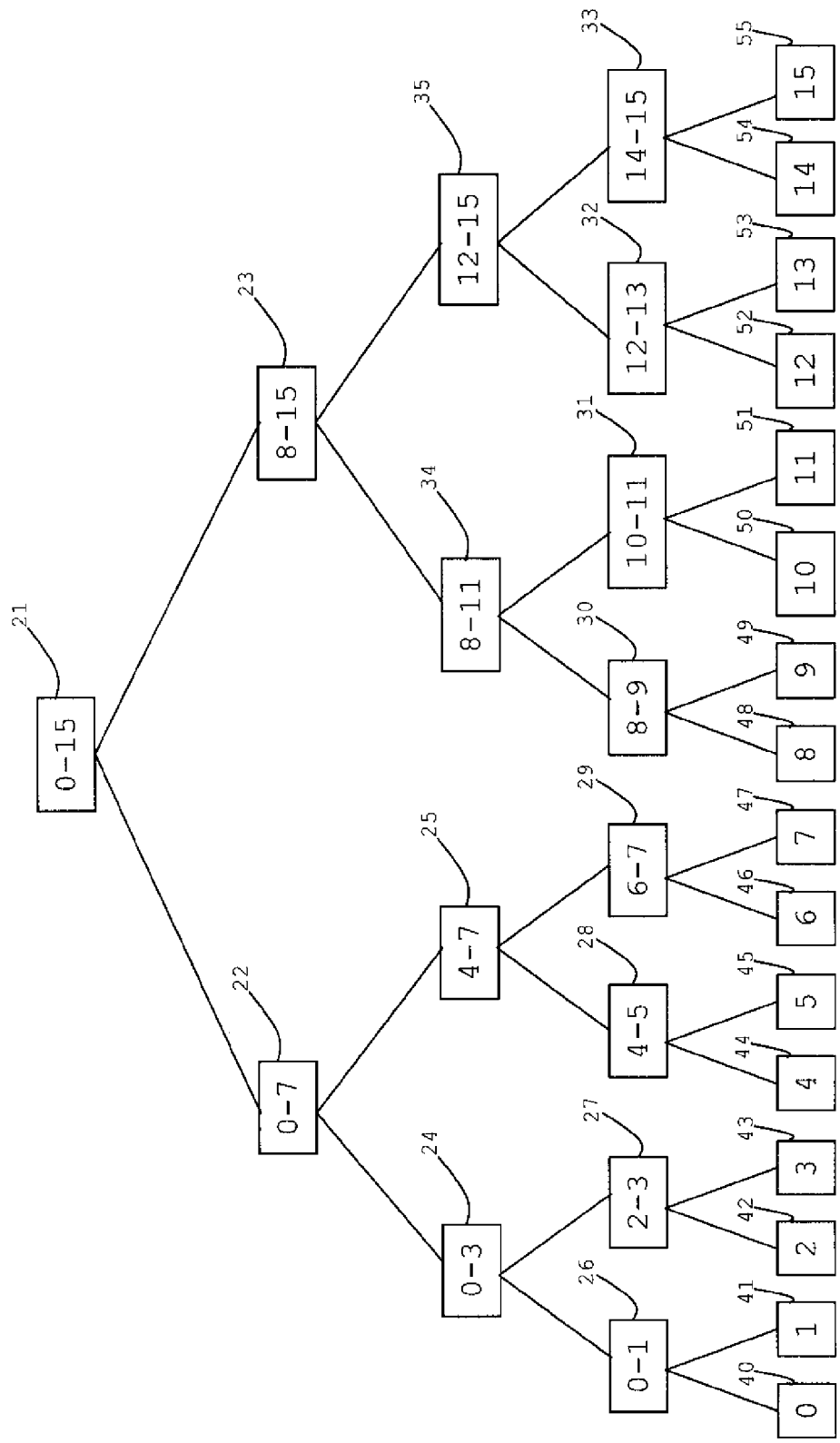
FIG. 3 is a diagram of a set of ranges which may cover a maximum number of devices having unique identifications for illustrating another example of device discovery.

FIG. 3 is a diagram of ranges indicating a situation for a range 21 having a value of 0-15 and that there may be 16 devices with unique IDs on bus 14, although host 10 is not necessarily aware of the 16 devices. The splitting of ranges may need to be completely effected to discover all of the devices on the bus. In FIG. 3, the values of a range are indicated in a box designated for the respective range. Range 21 may be split to ranges 22 and 23. Range 22 may be split into ranges 24 and 25. Range 23 may be split to ranges 34 and 35. Range 24 may be split to ranges 26 and 27. Range 25 may be split to ranges 28 and 29. Range 34 may be split to ranges 30 and 31. Range 35 may be split to ranges 32 and 33. Range 26 may be split to ranges 40 and 41. Range 27 may be split to ranges 42 and 43. Range 28 may be split to ranges 44 and 45. Range 29 may be split to ranges 46 and 47. Range 30 may be split to ranges 48 and 49. Range 31 may be split to ranges 50 and 51. Range 32 may be split to ranges 52 and 53. Range 33 may be split to ranges 54 and 55. Each of the ranges 40-55 may have only one value. The one value may be a unique ID of one device. Therefore, collisions of messages may occur at all of the ranges except at ranges 40-55.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. A system for discovering devices on a common bus without a direct communication path between a master and one or more of the other devices communicating on the common bus, comprising:
a wired communication bus; a host device;
at least two devices communicating on the wired communication bus, wherein the first device is connected to the host device and a second device is connected to the first device wherein the host communicates to the second device via the wired communication bus through the first device; and
wherein:
the host device transmits a message on the wired communication bus requesting a response from any device on the bus;
each device on the bus has a unique identification by which the device can be identified on the bus upon receiving a message from the host device;
a broadcasting of a first message transmitted by the host device indicates a range from a minimum designation to a maximum designation;
the minimum designation covers up to one unique designation of a device on the bus;
the maximum covers virtually all unique designations of devices on the bus; one or no response from a device on the bus indicates no collision and that the message is not to be again sent by the host device for the range, wherein the range is greater than one and the unique identification of the responding device is within the range;
two or more responses from devices on the bus indicate a collision, and that the message is to be again sent by the host device to a portion of the range; and
two or more responses from devices on the bus having unique designations within the portion of the range indicate a collision and that the message is to be again sent by the host device to a portion of the portion of the range.

2. The system of claim 1, wherein one or no response received from a device on a bus having a unique designation which is covered by a range or any portion of the range, indicates that the message need not again be transmitted within the range or any portion of the range.

3. The system of claim 2, wherein for each response from a device and received by the host device not resulting in a collision, the respective device is assigned a MAC address used for master slave/token passing (MS/TP) communication on the wired BACnet communication bus, wherein the MAC address is different than the other unique identification number.

4. The system of claim 3, wherein a device on the bus having a MAC address is not subject to responding to the message transmitted by the host device using the range or any portion of the range, covering a unique designation of the device.

5. The system of claim 3, wherein upon each device being assigned a MAC address, there is a mapping between a unique designation and a MAC address of the respective device.

6. The system of claim 1, wherein a portion of the range or of any portion of the portion of the range is a one-half of the range or any portion of the range that is divided.

7. The system of claim 1, wherein the bus is a shared communications bus having capabilities of direct communication and broadcast communication.

8. A method for discovering devices on a communication bus, comprising:

transmitting a broadcast message on a wired communication bus for virtually all devices including devices having unique identifications within a range which comprises the unique identifications; wherein
    a device broadcasts a response message when the device has a unique identification that matches an identification within the range;
    when more than one device broadcasts a response message, then there is a collision;
    when only one device broadcasts a response message, then there is just one device within the range; and
    when no device broadcasts a response message, then there is no device within the range; and
assigning a second unique identifier to each identified device when the identified device is the only one device that broadcasted a response within the range, wherein the second unique identifier is used for Master slave/token passing (MS/TP) communications via the wired communication bus.

9. The method of claim 8, wherein a collision is detectable collision, a detectable overlapped message, or two or more non-overlapped messages within an allotted time period.

10. The method of claim 8, wherein if a collision is detected in a range then the range is split into half ranges and a broadcast message is transmitted to each half range which may result in devices broadcasting multiple response messages, one response message, or no response message.

11. The method of claim 10, wherein only if there are two or more response messages from devices having unique identifications covered by a half range, then that half range is further divided in half for transmission again of the broadcast message.

12. The method of claim 11, wherein if one or no response message is received from a device having a unique identification within a half of the half range, then the half of the half of the range is not split for transmission again of the broadcast message.

13. The method of claim 12, wherein if more than one response message is received from a device within the half of the half of the range, then the half of the half of the range is split into two portions for transmission again of the broadcast message.

14. A method for discovering devices on a communications bus, comprising:
    providing a host that transmits a message on a bus; and
    assigning a communication identifier to the responding device when only one device responds to transmitted message; and wherein:
        one or more devices are connected to the bus, wherein one device is wired to the host and each device is wired to at least one other device on the bus; each device on the bus has a unique identification;
        the message transmitted on the bus is to each device having an identification within a range of identifications;
        a device that receives the message provides a response to the message; and
        when a response is provided by more than one device, then the host transmits the message on the bus to devices within a portion of the range of identifications, and if another response is provided by more than one device, the host further transmits the message on the bus to devices within a portion of the portion of the range of identifications, and so on, until a response is provided by one or no device.

15. The method of claim 14, wherein the host transmits the message on the bus to devices at another portion of the range or portion of identifications.

16. The method of claim 15, wherein:
a portion of a range or a portion is one-half of the range or portion;
a response from two or more devices in a range or portion results in another transmission to devices having an identification in one or two halves of the half of the range or portion; and
a response from just one device results in no further search for devices having an identification in the half of the range or portion.

17. The method of claim 16, wherein:
the host device transmits another message to a another half of the range or portion; and
if more than one device responds, then the host device transmits another message to a half of the other half of the range or portion.

18. The method of claim 14, wherein:
the host transmits a message to one or more devices having an identification in the range or a portion of the range of identifications;
if there is no response from any device having an identification in the range or a portion of the range, then the message is not transmitted to a portion of that range or portion of the range;
if there is a response from just one device having an identification in the range or portion of the range, then the message is not again transmitted to a portion of that range or portion of the range;
if there is more than one response from more than one device having an identification in the range or portion of the range, then that range or portion of the range is divided into halves, and the message is transmitted each half at different times;
if there is a response from two or more devices on one of the halves, then that one of the halves the range or portion of the range is divided in half for a transmission of the message to none, one or more devices to a new half of the one of the halves, and so on until there is one or no response; and
half portions of a preceding half portion of a portion or other portions of the range are subject to messages being sent to none, one or more devices in each portion until there is one or no response from a device.

19. The method of claim 14, wherein the method for discovering devices in a portion of a range, or a portion of the portion of the range, and so on, where a succeeding portion is about half of a preceding range or portion, comprises a binary search.

20. The method of claim 14, wherein the bus is a shared communications bus having capabilities of direct communication and broadcast communication.

* * * * *